United States Patent
Nakagaki et al.

(10) Patent No.: US 8,061,779 B2
(45) Date of Patent: Nov. 22, 2011

(54) FRAME STRUCTURE OF SEAT BACK FOR VEHICLE AND SEAT BACK FOR VEHICLE WITH FRAME STRUCTURE

(75) Inventors: Yoshihisa Nakagaki, Toyota (JP); Yuji Tokiwa, Toyota (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 150 days.

(21) Appl. No.: 12/387,723

(22) Filed: May 6, 2009

(65) Prior Publication Data

US 2009/0289491 A1    Nov. 26, 2009

(30) Foreign Application Priority Data

May 20, 2008  (JP) ................................. 2008-131647

(51) Int. Cl.
  *A47C 7/02* (2006.01)
(52) U.S. Cl. .............. 297/452.2; 297/452.18; 297/440.2
(58) Field of Classification Search ............. 297/452.18, 297/452.2, 440.2, 452.12, 452.14, 230.12, 297/230.13
See application file for complete search history.

(56) References Cited

U.S. PATENT DOCUMENTS

| | | | | |
|---|---|---|---|---|
| 3,638,999 A | * | 2/1972 | Tischler | 297/378.11 |
| 4,493,505 A | * | 1/1985 | Yamawaki et al. | 297/452.18 X |
| 4,567,743 A | * | 2/1986 | Cudini | 72/61 |
| 4,744,237 A | * | 5/1988 | Cudini | 72/370.22 |
| 4,829,803 A | * | 5/1989 | Cudini | 72/370.22 |
| 5,070,717 A | * | 12/1991 | Boyd et al. | 72/55 |
| 5,338,100 A | * | 8/1994 | Rees | 297/452.1 |
| 5,339,667 A | * | 8/1994 | Shah et al. | 72/58 |
| 5,431,326 A | * | 7/1995 | Ni et al. | 228/155 |
| 5,499,863 A | * | 3/1996 | Nakane et al. | 297/452.2 |
| 5,509,716 A | * | 4/1996 | Kolena et al. | 297/452.18 X |
| 5,528,829 A | * | 6/1996 | Rees | 29/897.2 |
| 5,557,961 A | * | 9/1996 | Ni et al. | 72/61 |
| 5,567,017 A | * | 10/1996 | Bourgeois et al. | 297/452.2 |
| 5,575,533 A | * | 11/1996 | Glance | 297/452.2 |
| 5,626,396 A | * | 5/1997 | Kuragano et al. | 297/452.2 |
| 5,676,423 A | * | 10/1997 | Pedronno et al. | 297/452.2 X |
| 5,716,100 A | * | 2/1998 | Lang | 297/452.2 X |
| 5,749,135 A | * | 5/1998 | Crane et al. | 297/452.2 X |
| 5,791,738 A | * | 8/1998 | Niezoldt | 297/452.18 |
| 5,829,831 A | * | 11/1998 | Sharman | 297/452.2 X |
| 5,882,039 A | * | 3/1999 | Beckman et al. | 280/781 |
| 5,884,722 A | * | 3/1999 | Durand et al. | 180/312 |
| 5,974,846 A | * | 11/1999 | Ash | 72/55 |
| 5,988,756 A | * | 11/1999 | Aufrere et al. | 297/452.18 |
| 6,032,501 A | * | 3/2000 | Bihrer | 72/58 |

(Continued)

FOREIGN PATENT DOCUMENTS

EP        160927 A2  *  11/1985  ................. 297/440.2

*Primary Examiner* — Rodney B White
(74) *Attorney, Agent, or Firm* — Flynn, Thiel, Boutell & Tanis, P.C.

(57) ABSTRACT

A frame structure of a seat back for a vehicle contains a seat back frame which includes a framework disposed endlessly along a peripheral edge of a panel frame in a plane form with a substantially rectangular shape, the framework including a steel tube portion with a closed rectangular cross-section into which a pressed member is formed by welding in accordance with a position where the seat back for the vehicle is fixed to a vehicle body, the steel tube portion contains a surface on which the seat back for the vehicle is fixed.

8 Claims, 9 Drawing Sheets

U.S. PATENT DOCUMENTS

| | | | |
|---|---|---|---|
| 6,241,318 B1 * | 6/2001 | Amano | 297/452.2 |
| 6,257,035 B1 * | 7/2001 | Marks et al. | 72/57 |
| 6,322,148 B1 * | 11/2001 | Kolena et al. | 297/452.2 |
| 6,347,836 B1 * | 2/2002 | Hayotte | 297/452.2 |
| 6,709,061 B2 * | 3/2004 | McWhinnie et al. | 297/452.18 |
| 7,066,552 B2 * | 6/2006 | Yoshida | 297/452.18 |

\* cited by examiner

FRAME STRUCTURE OF SEAT BACK FOR VEHICLE AND SEAT BACK FOR VEHICLE WITH FRAME STRUCTURE

BACKGROUND OF THE INVENTION

1. Field of the Invention Vehicle

The present invention relates to a frame structure of a seat back for a vehicle and a seat back for a vehicle with such a frame structure, in particular, relates to the frame structure of the seat back for the vehicle and the seat back for the vehicle with the frame structure which is capable of securing a strength of the seat back in a sheet for the vehicle, while at the same time decreasing the weight of the seat back.

2. Discussion of the Related Art

Conventionally, the sheet for the vehicle including a sheet cushion the lower portion of which is fixed to a floor portion of a vehicle compartment and a seat back the lower portion of which is supported by a rear portion of the sheet cushion has been used. With respect to the type of the seat back, there have been two types, one is a seat back which can be forwardly inclined and the other is a seat back which cannot be forwardly inclined so that it is maintained upright.

Such a seat back for the vehicle includes a seat back frame which comprises a panel frame in a plane form with a substantially rectangular shape and a framework disposed to be along a peripheral edge of the panel frame, and a pad covering the seat back frame and a trim for an outer skin, etc. are provided on the seat back frame.

As shown in FIG. 8, the seat back for the vehicle has been divided into two parts, each of which includes a structure in which a pipe product and a pressed product are assembled. In this connection, FIG. 8 shows one of the divided frameworks. For instance, with respect to the framework of the seat back for a rear seat which constitutes a leaning portion, as shown in FIG. 8, the seat back is supported at the three points, two of which are side portions of the lower section, and one of which is a door side of the upper section. As shown in FIG. 9, mainly from a technical point of view which is related to securing a torsion stiffness, a pipe member A with a closed cross-section is adopted as a structural member. The pipe member A is worked by a bending process so as to be shaped into a configuration which can be disposed to be the peripheral edge of the panel frame. On the other hand, in order to fix the seat back for the vehicle to a vehicle body via the pipe member A at the three respective points, a bracket member B as a pressed member is fixed to the pipe member A by welding.

In addition, as regulated by ECE (Automobile Regulation), in order to increase a maximum tolerant load which is applied to the rear seat due to a displacement of a luggage in a rear luggage compartment, the seat back for the rear seat extending at the substantially central portion of the panel frame and on which a reinforcing frame, both ends of which are fixed to the framework by welding, is disclosed by Japanese Patent Laid-open Publication 2003-235672, for instance.

By providing such a reinforcing frame, since the reinforcing frame is formed in such a way that an intermediate portion of the reinforcing frame extends through a portion on which an external force is exerted and both ends of the reinforcing member are connected to the framework including a high strength, dents on the panel frame can be prevented from being generated due to the fact that the intermediate portion of the reinforcing frame absorbs the external force generated by the displacement of the luggage, whereby its strength against the large load applied on an external force receiving portion can be improved.

However, such a structure has the following technical problems.

That is to say, recently, much attention has been paid to a decrease in the amount of fuel consumption, in view of the prevention of global warming, so that an effort has been made to improve an engine's performance and to decrease the weight of the automobile.

From the above points of view, the above structure adopts duplicate members, so that there is a room for further decreasing the weight of the automobile.

Conventionally, in the case of the seat for the vehicle, it was fixed to the necessary position of the vehicle body by adopting a steel tube as a strength member, while appropriately providing a bracket at the necessary position. More specifically, a bracket including a plane portion which is separately manufactured by a press is fixed on an outer surface of the pipe member by welding, so that an excessive member was adopted, from the technical point of view related to securing the necessary strength. This is contrary to decreasing the weight of the automobile. In particular, as described above, in case of the seat back for the rear seat, it is even more so when the reinforcing frame is adopted.

SUMMARY OF THE INVENTION

An object of the present invention is to provide the frame structure of the seat back for the vehicle and the seat back for the vehicle with the same frame structure which is capable of securing a necessary strength or stiffness of the seat back for the vehicle, while at the same time decreasing the weight of the seat back.

According to an embodiment of the present invention, there is provided a frame structure of a seat back for a vehicle comprising a seat back frame which includes a framework disposed to be endless along a peripheral edge of a panel frame in a plane form with a substantially rectangular shape, said framework includes a steel tube portion with a closed rectangular cross-section into which a pressed member is formed by welding in accordance with a position where the seat back for the vehicle is fixed to a vehicle body, said steel tube portion comprising a surface on which the seat back for the vehicle is fixed.

According to the frame structure of the seat back for the vehicle, by adopting a steel tube portion with a rectangular cross-section including a surface on which the seat back is fixed, in accordance with a position where the seat back is fixed, the duplication of the plane member which is caused by providing a pipe member for a conventional structural member and a bracket member for a fixing part can be avoided due to the fact that the steel tube portion can serve not only to secure the strength of the seat back but also to fix the frame, whereby the necessary strength or stiffness of the seat back for the vehicle can be secured, while at the same time the weight of the vehicle can be decreased.

According to a preferred configuration, said steel tube portion is formed in such a way that pressed members with C-shaped cross-sections are welded with respective opening portions abutting against each other.

According to a preferred configuration, in said framework, said steel tube portion is fixed on said pipe member formed by a rolling process by welding.

According to a preferred configuration, the upper, the lower, the left and the right sides of said framework comprises a pipe member, respectively, and said steel tube portion is provided at each corner of the panel frame between the pipe members.

According to a preferred configuration, said steel tube portion comprises perforated holes which are formed during the process for manufacturing said pressed member so long as the strength required for said steel tube portion is attained.

According to a preferred configuration, the seat back for the vehicle is divided into two parts, in each of the divided parts of the seat back for the vehicle, said steel tube portions are provided on at least three corners out of the four corners of the panel frame.

According to a preferred configuration, the framework is formed in such a way that the pressed members, each of which includes a substantially C-shaped cross-section, are welded with the respective opening portions abutting against each other.

In order to solve the above technical problems, according to the sheet for the vehicle of the present invention, it comprises a seat back for the vehicle including a frame structure, and a sheet cushion, the lower portion of which is fixed on the floor portion of the vehicle compartment.

According to an embodiment of the present invention, by adopting the steel tube portion with a closed rectangular cross-section including a surface on which the frame is fixed, in accordance with the position on which the sheet is fixed, the duplication of the plate members which is caused by the fact that the pipe members for the conventional structural members and the bracket members for the fixing parts are provided can be avoided, due to the fact that said steel tube portion serves not only to secure the strength of the seat back for the vehicle, but also to fix the frame, whereby the necessary strength or stiffness of the seat back for the vehicle can be secured, while at the same time the weight of the vehicle can be decreased.

DESCRIPTION OF THE PREFERRED EMBODIMENT OF THE INVENTION

Figure 1:
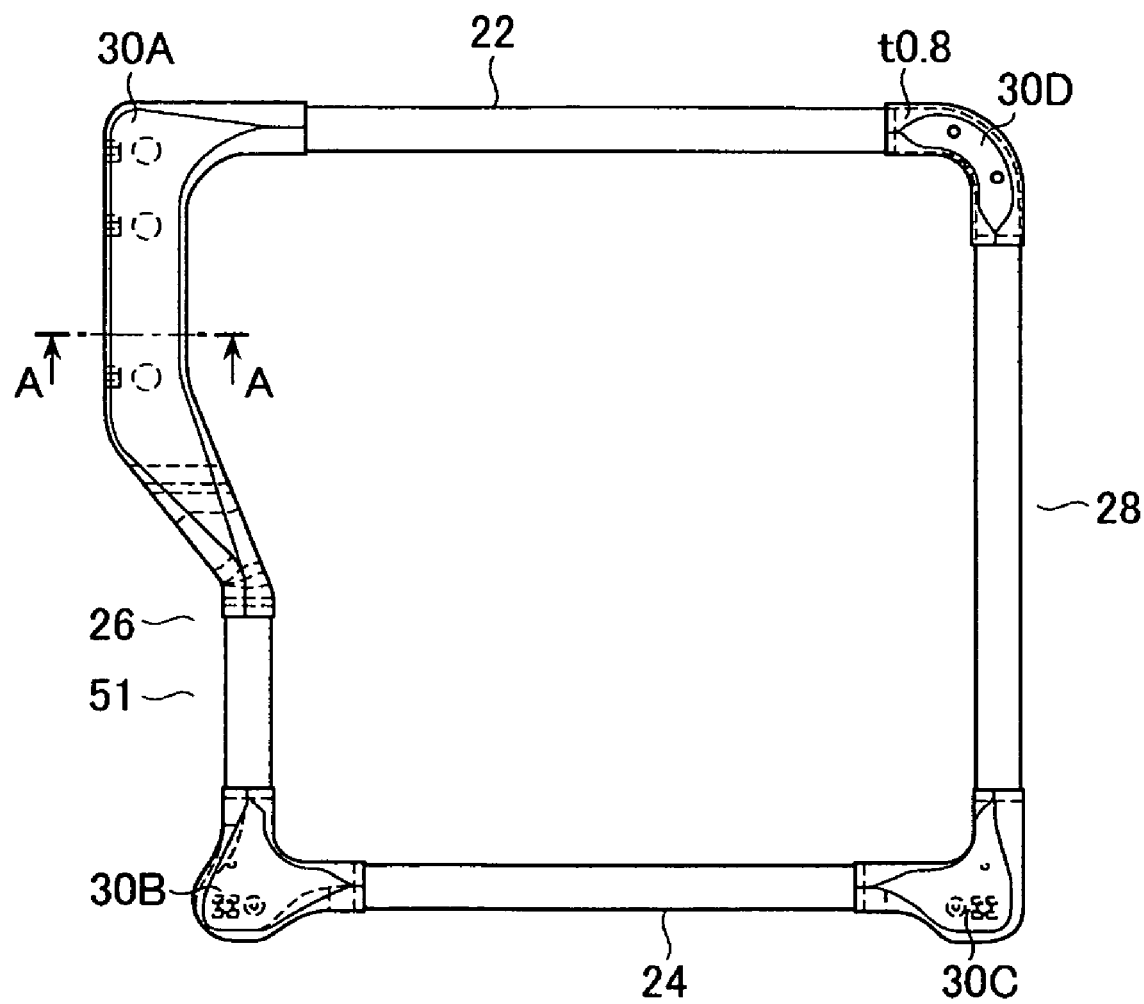
FIG. 1 is a front view showing a frame structure of the seat back for the vehicle according to an embodiment of the present invention.
Figure 2:
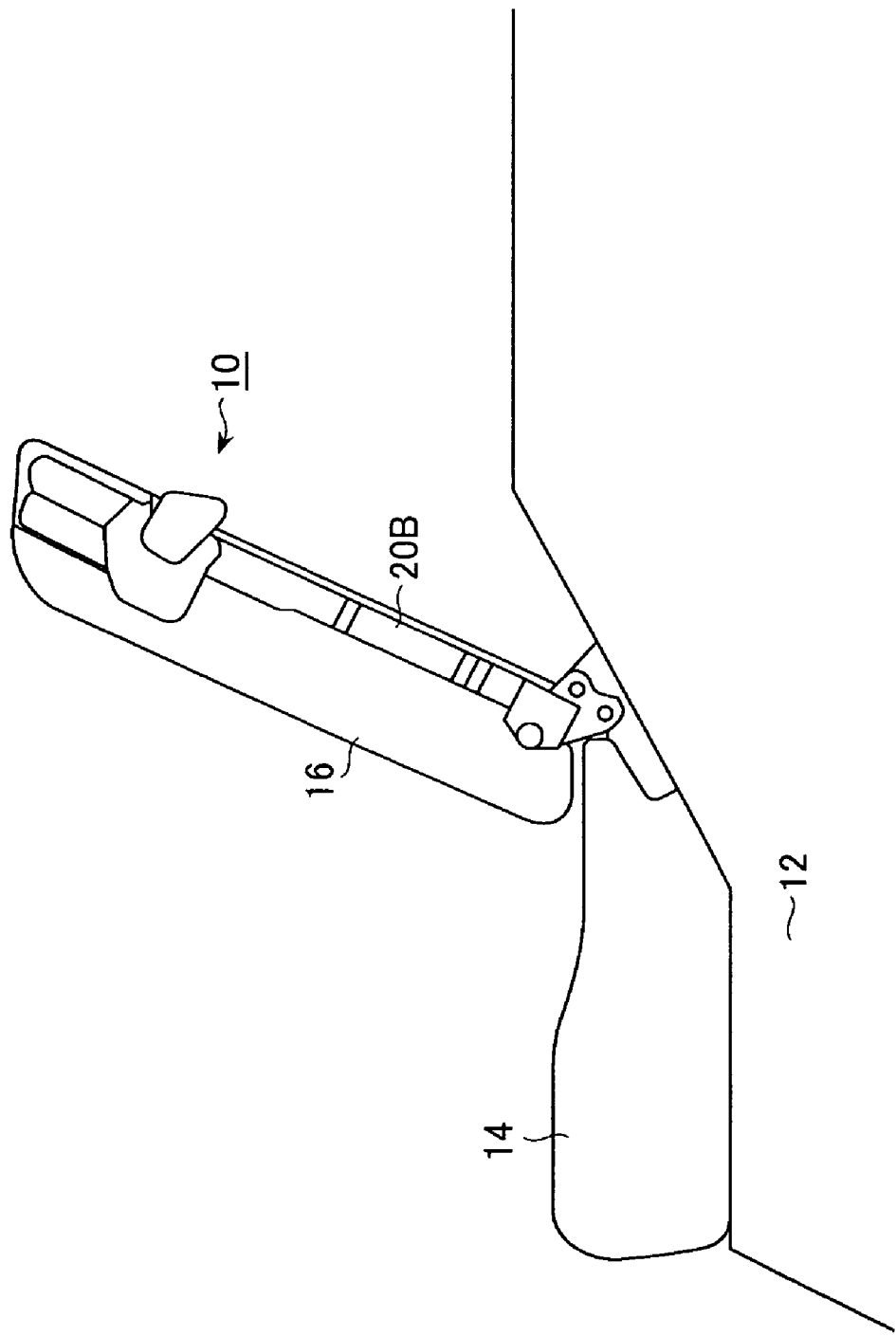
FIG. 2 is a side view showing a frame structure of the seat back for the vehicle according to the embodiment of the present invention.

As shown in FIGS. 1 and 2, a rear seat 10 for the vehicle of the present invention comprises a sheet cushion 14, the lower portion of which is fixed to a floor portion 12 of the vehicle compartment and a seat back 16, the lower portion of which is fixed to the rear portion of the sheet cushion 14. The seat back 16 is adopted to be forwardly inclined, as described below.

A pad (not shown) which is mounted on a front face side of a framework 20A so as to cover the front face of the framework 20A, and a skin (not shown) in a bag form so as to fully cover the framework 20A and the pad are provided on the sheet for the vehicle.

As shown in FIG. 1, the rear seat back is divided into two parts, each of the divided parts includes a seat back frame having a panel frame 20B and the framework 20A.

Since the divided parts have the same structure, one of the divided parts (left divided part in FIG. 1) is now explained.

The panel frame 20B includes a steel plate with a substantially rectangular shape and a convex portion forwardly protruding is partially formed in a desired pattern on the panel frame 20B.

Figure 4:
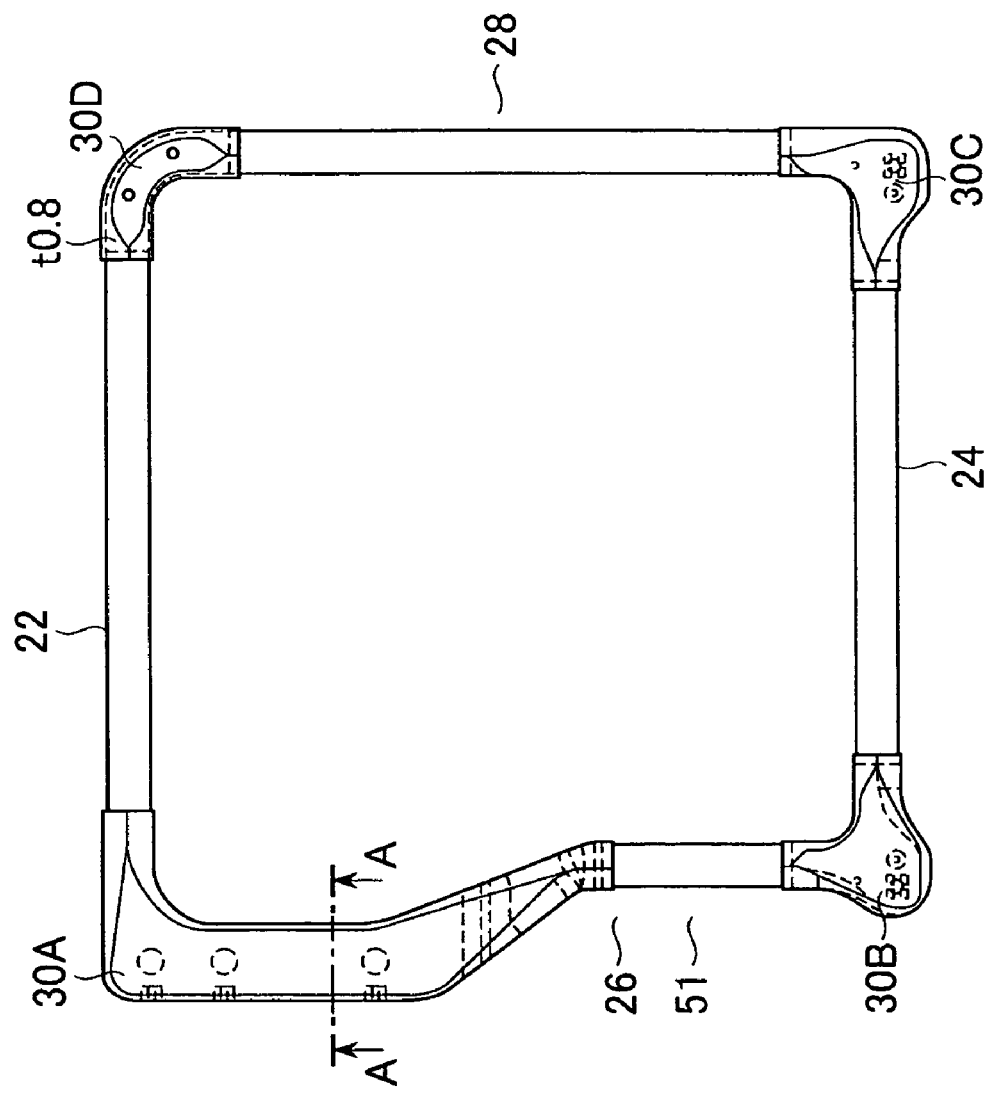
FIG. 4 is a front view showing left half of the frame structure of the seat back for the vehicle according to the embodiment of the present invention.

The framework 20A made of a steel plate, as shown in FIGS. 1 and 4, is disposed to be the front side of the panel frame and along the peripheral edge of the panel frame. More specifically, the framework 20A is formed into a substantially rectangular shape in a loop form so as to be along the peripheral edge of the panel frame 20B. The framework 20A consists of the upper portion 22, the lower portion 24, the left side portion 26 and the right side portion 28. The framework 20A is welded to the front side of the panel frame by a conventional welding process. In this connection, in order to avoid an interference with a wheel housing 58, a concave portion 51 is provided on the side portion of the framework 20A.

Each of the upper portion 22, the lower portion 24, the left side portion 26 and the right side portion 28 consists of a steel pipe member with a predetermined thickness which is formed by rolling a plate member. Steel tube portions 30A, B, C, D, each of which is so formed as to have a rectangular cross-section by welding a pressed member, are provided on the four corners of the panel frame, respectively. A surface on which the sheet for the vehicle is fixed is provided on each of the steel tube portions 30A, B, C, D. Each end of the respective steel tube portions 30A, B, C, D is fixed to the corresponding end of the steel pipe member by a conventional welding process.

That is to say, as shown in FIG. 4, either end of the upper pipe member 22 are joined to the steel tube portions 30A and 30D, respectively, either end of the lower pipe member 24 is joined to the steel tube portions 30B and 30C, respectively, either end of the left side pipe member 26 is joined to the steel tube portions 30A and 30B, respectively, and either end of the right side pipe member 28 is joined to the steel tube portions 30C and 30D, respectively.

Figure 5:
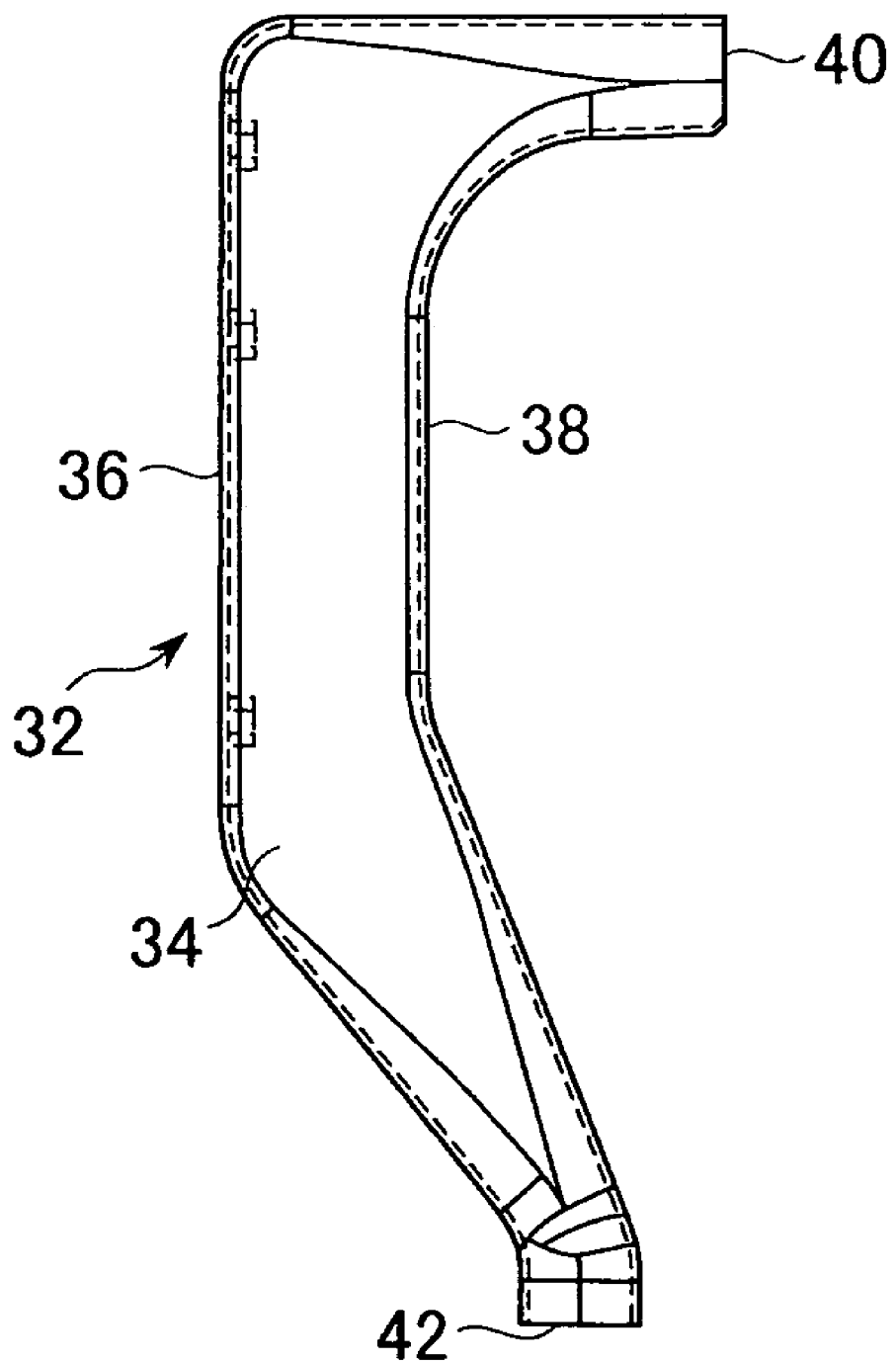
FIG. 5 is a front view showing the one half portion of the steel tube portion 30A on the left upper portion in FIG. 4.
Figure 6:
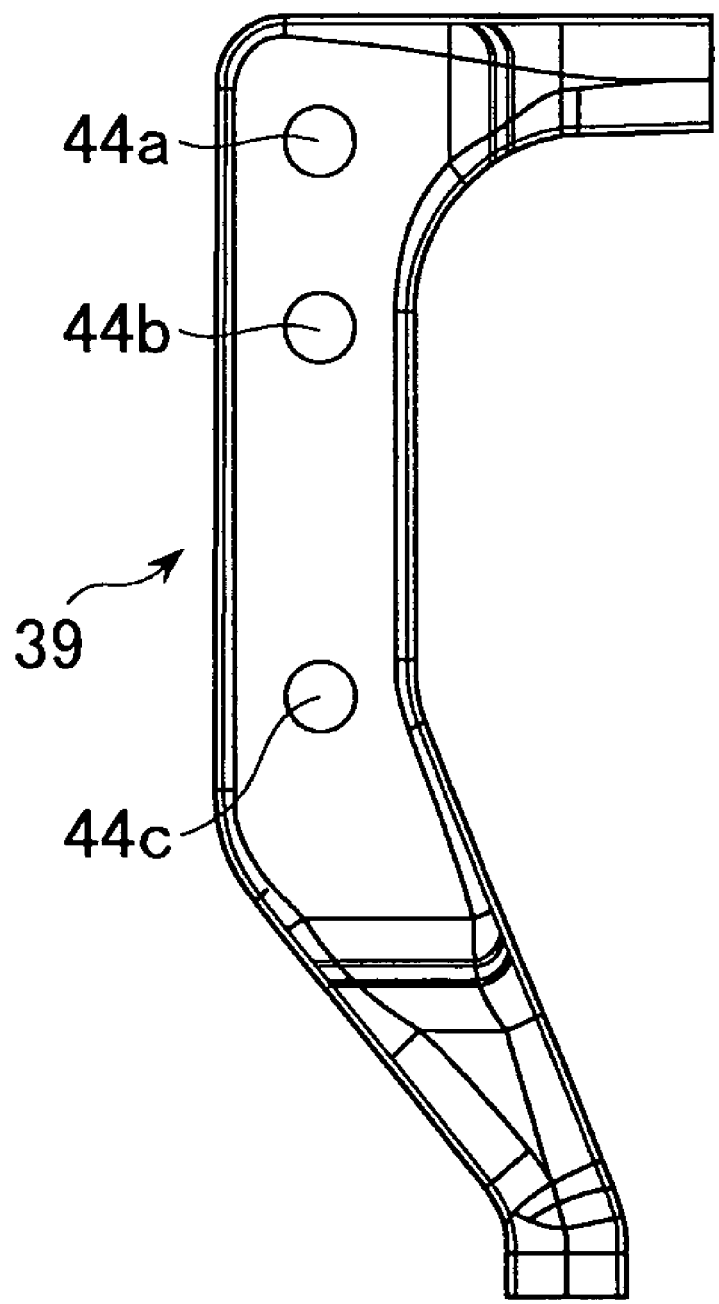
FIG. 6 is a front view showing the other half portion of the steel tube portion 30A on the left upper portion in FIG. 4.

Since the structures of the steel tube portions 30A, B, C, D are the same, only one (the steel tube portion 30A on the left upper position in FIG. 4) of the steel tube portions is explained. As shown in FIGS. 5 and 6, the steel tube portion 30A is divided along a longitudinal direction of the framework 20A into two parts. As shown in FIG. 5, the divided half portion 32 which is one of the divided portions of the steel tube portion 30A is machined into a C-shaped cross-section by a press process, a surface for joining the divided half portion 32 to the other half portion 39 by welding (a laser welding, for instance) is formed on both edge portions 36, 38 each forming an opening portion 34. In addition, as shown in FIG. 5, in order to join the steel tube portion 30A to the pipe member by welding (a laser welding, for instance), with respect to both ends 40, 42 of the steel tube portion 30A, each joining surface of both edge portions of the divided half portion 32 extends toward each other as it becomes close to the respective end of the steel tube portion 30A to form a half circle cross-section at each end.

Since the other half portion 39 of the steel tube portion 30A has the same structure as the one half portion 32, as shown in FIG. 6, the explanation about the structure of the other half portion 39 in detail is omitted, and the difference between them is now explained. As shown in FIG. 6, the other half portion 39 includes perforated holes 44 so long as the strength for the steel tube portion 30A is fulfilled. The perforated holes 44 are formed during a process in which the steel tube portion 30A is formed into a plate by a press process. The size, position and number of the perforated holes 44 may be appropriately determined in view of the strength required for the steel tube portion 30A.

Figure 7:
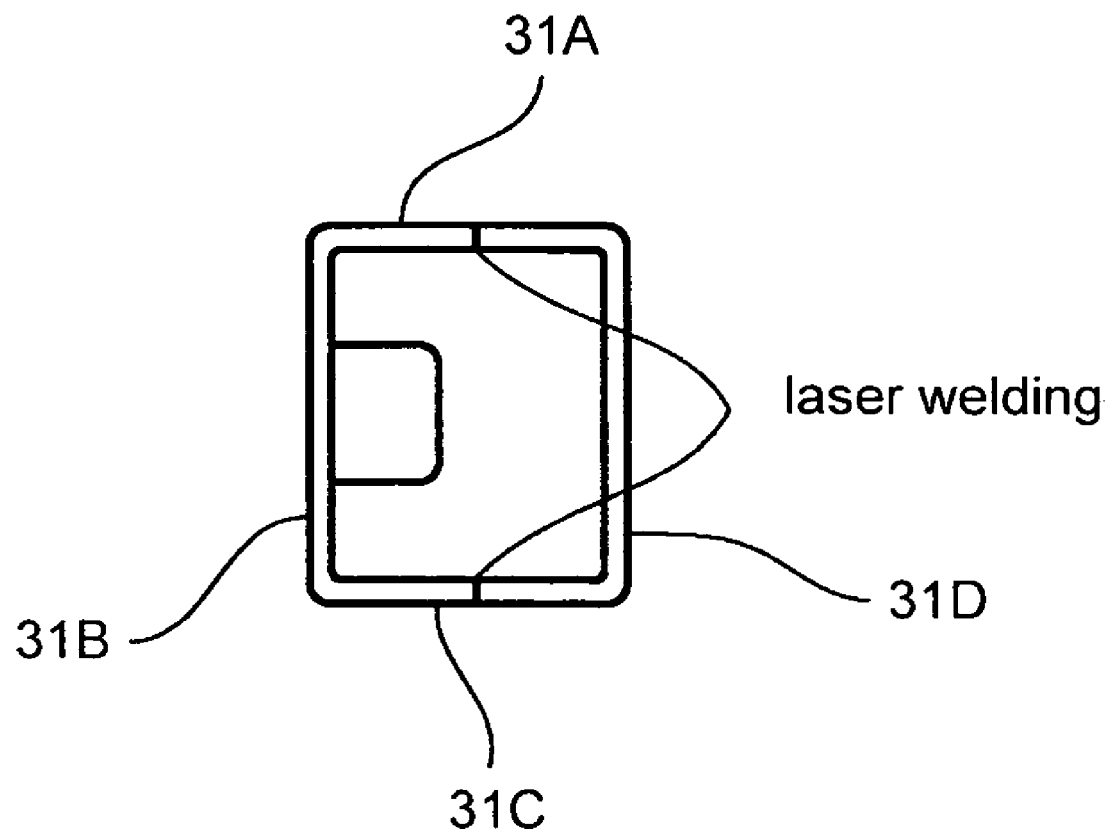
FIG. 7 is a sectional view taken along A-A line in FIG. 4.
Figure 8:
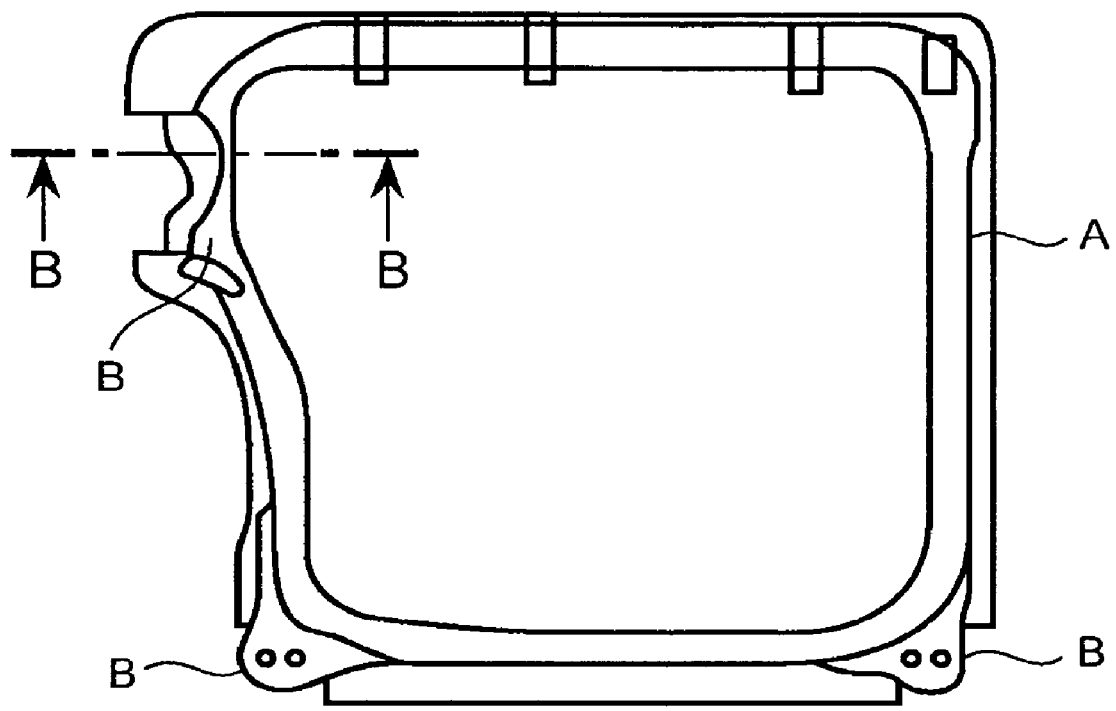
FIG. 8 is a front view showing a frame structure of the conventional seat back for the vehicle.
Figure 9:
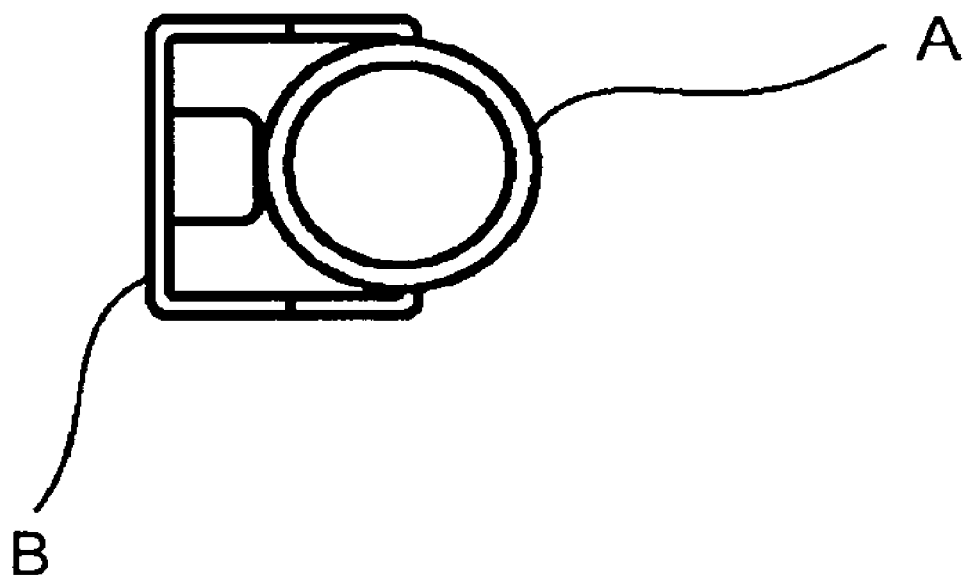
FIG. 9 is a sectional view taken along B-B line in FIG. 8.

As such, as shown in FIG. 7, the steel tube portion 30A is divided into two parts. The steel tube portion 30A has a closed rectangular cross-section by joining pressed members, each of which includes a C-shaped cross-section, in such a way that joining faces of the two parts are welded (laser welding, for instance) with their respective opening portions abutting against each other. As compared with the conventional case where excessive members have been used by welding pipe members to bracket members manufactured by the press process, the necessary strength or the necessary stiffness is secured, while at the same time the weight of the members are decreased. In this case, four surfaces (31A, B, C, D in FIG. 7) on each of which the seat back for the vehicle is fixed by making each cross-section a closed rectangle. The surfaces are adopted to fix the seat back for the vehicle and may be appropriately determined in accordance with the position where the steel tube portion is provided. In addition, the size of the rectangular closed cross-section may be determined in order to secure the necessary stiffness coefficient, in view of the bending stiffness. Alternatively, instead of the pressed members, each of which includes a C-shaped cross-section, abutting against each other, the rectangular closed cross-section may be attained by adopting the pressed member with a C-shaped cross-section as one part, while adopting a conventional plate member to make these two members abut against each other. In this connection, other steel tube portions 30B, C, D have the same structure as the steel tube portion 30A.

Now, the operation of the rear seat 10 for the vehicle is now described below.

Figure 3:
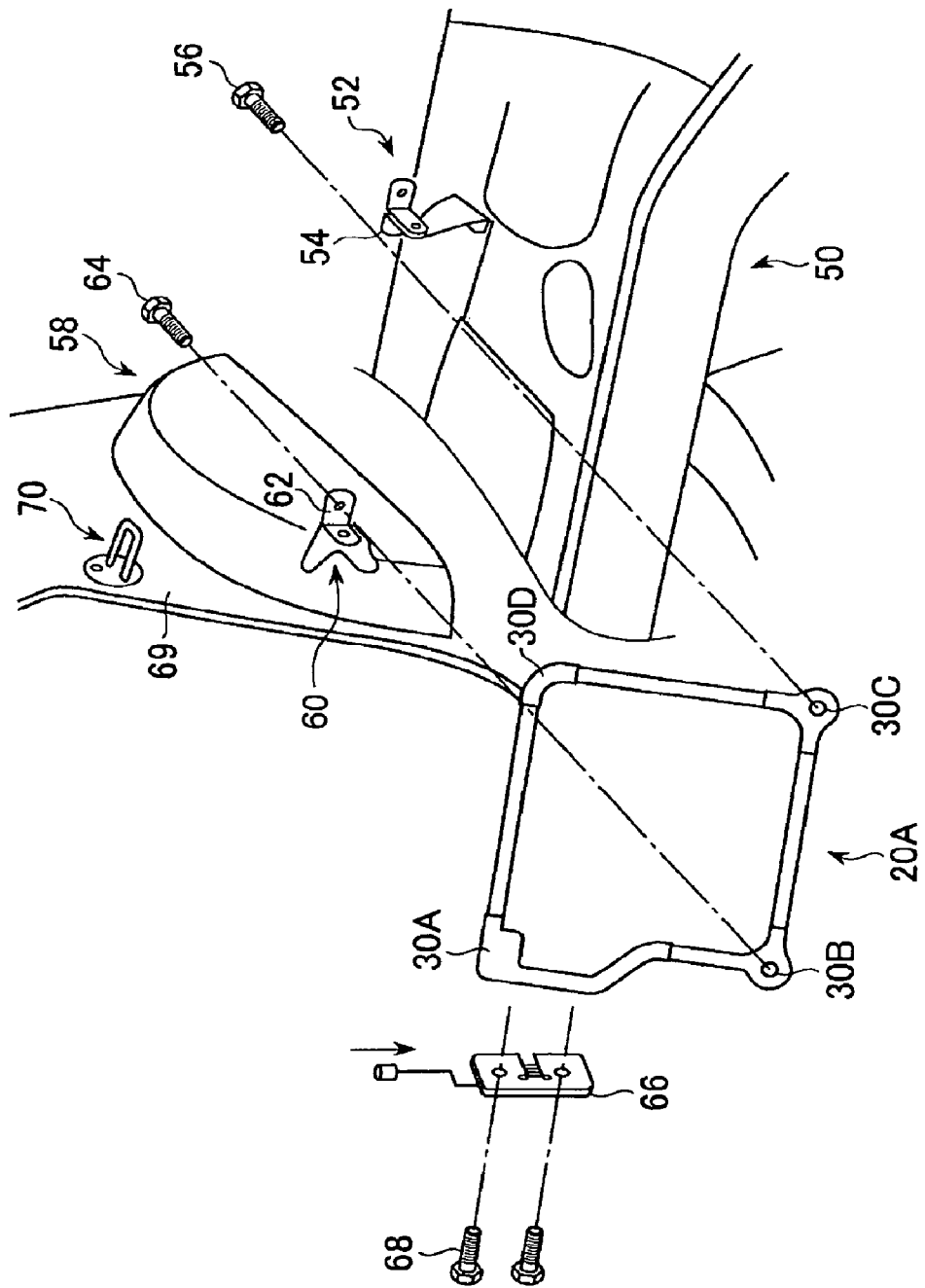
FIG. 3 is a partial perspective view showing a situation in which the seat back for the vehicle according to the embodiment of the present invention is fixed on the vehicle.

As show in FIG. 3, the framework 20A is fixed to the vehicle body through the steel tube portions 30A, B, C, which means that the framework 20A is fixed at three points. More specifically, the plane portion of the rectangular closed cross-section of the steel tube portion 30C is fixed to the bracket portion 54 of the central hinge portion 52 provided on the body floor 50 by bolts 56, the plane portion of the rectangular closed cross-section of the steel tube portion 30B is fixed to the bracket portion 62 of the side hinge portion 60 provided on the wheel housing 58 by bolts 64. The framework 20A and, thus, the seat back can be forwardly inclined about an axial line between the central hinge portion 52 and the side hinge portion 60.

Accordingly, a pair of hinges about which the rear seat 10 for the vehicle is forwardly and rearwardly rotationally pivoted are provided on the rear seat 10 for the vehicle. Each hinge portion serves to make the corresponding lower portion of the framework 20A pivot relative to the vehicle body and includes a bracket which is provided on the body floor so as to protrude from the body floor and a pivotal axis which causes the framework 20A to pivot about the bracket, whereby the rear seat 10 for the vehicle in the upright position can be reciprocally forwardly inclined about the pivotal axis of each hinge portions.

Further, the plane portion of the rectangular closed cross-section of the steel tube portion 30C is fixed to the lock part 66 by bolts 68. The seat back for the rear sheet can be fixed on the vehicle body when the seat back for the vehicle is in the upright position by engaging a striker 70 provided on the vehicle body with the lock part 66 and disengaging it therefrom. In this connection, the respective divided parts of the seat back for the rear seat can be forwardly inclined independent of each other.

In a case where the rear seat 10 for the vehicle is in the upright position, when a load is applied on the rear seat 10 for the vehicle (a load originating from luggage disposed in the luggage compartment applied to the rear seat 10 from the rear portion, for instance), the framework 20A disposed to be along the peripheral edge of the panel frame 10 serves as a strength member so as to prevent a deformation, such as dents on the pane frame 10, from being generated. In addition, in a case where the framework 20A needs securing a torsion stiffness, such a torsion stiffness can be attained by enlarging the closed cross-sections of the steel tube portions 30A, B, C, D or increasing their thickness.

On the other hand, with respect to the steel tube portions 30A, B, C, D provided on the four corners of the framework 20, respectively, by adopting the steel tube portions 30A, B, C, D, each of which includes a closed rectangular cross-section with a surface on which the frame is fixed, since the respective steel tube portions 30A, B, C, D serve not only to secure the strength, but also to fix the frame, the duplication of the plate members caused by the fact that the pipe members as the conventional strength members and the bracket members as the fixing parts have been adopted can be avoided, whereby the necessary strength for the seat back for the vehicle can be secured while, at the same time, the weight of the vehicle can be decreased.

The present inventor manufactured the seat back 16 for the vehicle of the present invention and compared it with the conventional one. More specifically, it was confirmed that, as compared with the conventional seat back, the weight of the frame structure of the seat back 16 for the vehicle could be decreased up to 10% while the same strength was secured by adopting the framework 20A at the four corners of which the steel tube portions 30A, B, C, D are provided, respectively.

Alternatively, the entire structure of the framework 20A may be divided into two parts without using the pipe members. That is to say, in the above-described embodiment, the steel tube portions 30A, B, C, D, each of which includes a rectangular cross-section, are provided at four corners of the framework 20A, respectively, to combine the steel tube portions 30A, B, C, D with the pipe members, but the framework 20A may be formed by dividing the framework 20A into two parts and welding the pressed members, each of which includes an endless C-shaped cross-section, with the respective opening portions abutting against each other.

As described above, the preferred embodiment of the present invention was described in detail, however, those skilled in the art can modify, or change in various manners without departing from the scope of the present invention. For instance, in this embodiment, the seat back for the vehicle divided into two parts was described, but a single seat back, four corners of which are supported, may be adopted.

In addition, in this embodiment, the sheet back 16 for a wagon car was explained, but the frame structure of the seat back 16 may be applied to a sedan car or other types of vehicles. In this connection, in a case where the rear seat 10 is supported at three points, as compared with the sedan car, since it is more technically difficult for the wagon car to secure a torsion stiffness of the rear seat 10, the present invention is more effective for the wagon car.

Further, in this embodiment, the steel tube portion 30A, B, C, D, each of which includes a rectangular cross-section, were adopted at the four corners of the framework 20A, respectively, but, with respect to the corner portion (the steel tube portion 30D in the above embodiment) which does not need to be fixed to the vehicle body, the conventional structure may be adopted.

Still further, in a case where the sheet for the vehicle is the rear seat 10, in order to endure the load generated by the displacement of the luggage disposed in the vehicle compartment, a reinforcing frame fixed on the framework 20A may be additionally provided. According to the present invention, the increase of the weight due to the provision of such a reinforcing frame can be substantially off-set.

Still more further, the surface on which the seat back for the vehicle is fixed may be fixed not only by bolts, but also by welding.

The present invention is applicable not only to automobiles, but also to general vehicles which transport passengers sitting on seats such as railway vehicles and air planes. In a case where the present invention is applied to vehicles other than automobiles, the duplication of plate members due to the fact that pipe members as the conventional structural members and bracket members as fixing parts have been adopted can be avoided, whereby the necessary strength or stiffness for the seat back can be secured, while at the same time the weight of the seat back can be decreased.

The present application claims priority to Japanese Patent Application No. 2008-131647, filed May 20, 2008, the disclosure of which is incorporated herein by reference in its entirety.

What is claimed is:

1. A frame structure of a seat back for a vehicle comprising a substantially rectangular, endless framework disposed along a peripheral edge of a planar panel, the framework having a steel tube portion with a closed rectangular cross-section which is formed by welding pressed members, the seat back adapted to being fixed to a vehicle body and the steel tube portion comprising a surface through which the seat back is fixed to the vehicle body.

2. The frame structure of a seat back for a vehicle according to claim 1, wherein said steel tube portion is formed by welding pressed members with C-shaped cross sections having opening portions abutting against each other.

3. The frame structure of a seat back for a vehicle according to claim 1, wherein, in said framework, said steel tube portion is fixed on said pipe member formed by a rolling process by welding.

4. The frame structure of a seat back for a vehicle according to claim 3, wherein an upper side, a lower side, a left side and a right side of said framework comprises a pipe member, respectively, and said steel tube portion is provided at each corner of the panel frame between adjacent pipe members.

5. The frame structure of a seat back for a vehicle according to claim 1, wherein said steel tube portion comprises perforated holes which are formed during a process for manufacturing said pressed member so long as the strength required for said steel tube portion is attained.

6. The frame structure of a seat back for a vehicle according to claim 1, wherein the seat back for the vehicle is divided into two parts and, in each of the divided parts of the seat back for the vehicle, said steel tube portions are provided on at least three corners out of four corners of the panel frame.

7. The frame structure of a seat back for a vehicle according to claim 1, the framework is formed in such a way that the pressed members, each of which has a substantially C-shaped cross section, are welded with opening portions abutting against each other.

8. A seat for a vehicle comprising a seat back for the vehicle including a frame structure according to claim 1, and a sheet cushion a lower portion of which is fixed on a floor portion of a vehicle compartment.

\* \* \* \* \*